Figure 1:
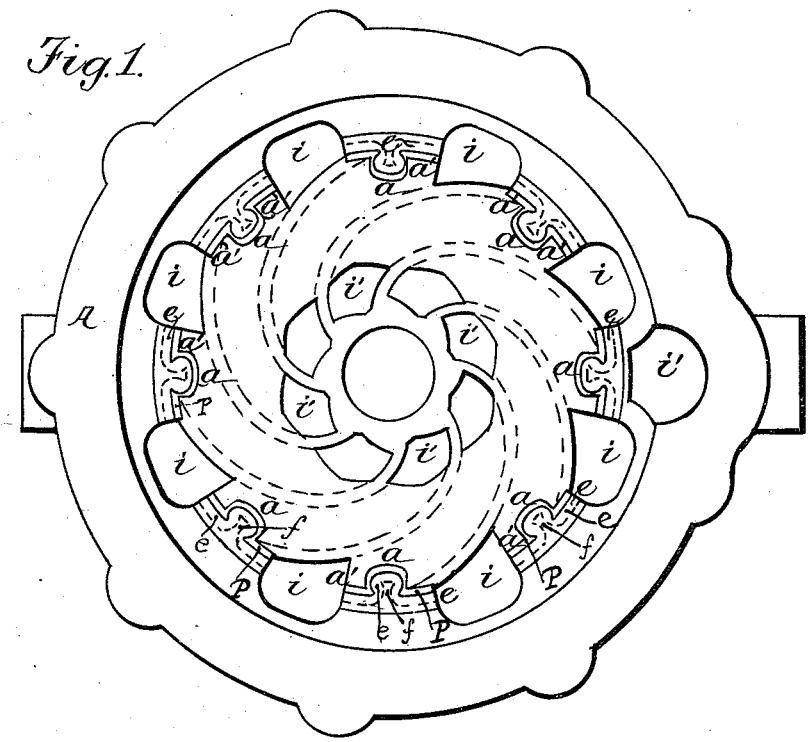

(No Model.) 4 Sheets—Sheet 1.

L. H. NASH.
APPARATUS FOR CONSTRUCTING WATER METERS.

No. 408,508. Patented Aug. 6, 1889.

Witnesses:
R. E. Grant
A. C. Rawlins

Inventor:
Lewis H. Nash
by Johnson and Johnson
Attys.

(No Model.) 4 Sheets—Sheet 2.
L. H. NASH.
APPARATUS FOR CONSTRUCTING WATER METERS.

No. 408,508. Patented Aug. 6, 1889.

Witnesses:— Inventor:—

(No Model.) 4 Sheets—Sheet 3.

L. H. NASH.
APPARATUS FOR CONSTRUCTING WATER METERS.

No. 408,508. Patented Aug. 6, 1889.

Witnesses:
R. E. Grant
A. C. Rawlings

Inventor:—
Lewis H. Nash
by Johnson and Johnson
Attys.

(No Model.) 4 Sheets—Sheet 4.
L. H. NASH.
APPARATUS FOR CONSTRUCTING WATER METERS.
No. 408,508. Patented Aug. 6, 1889.
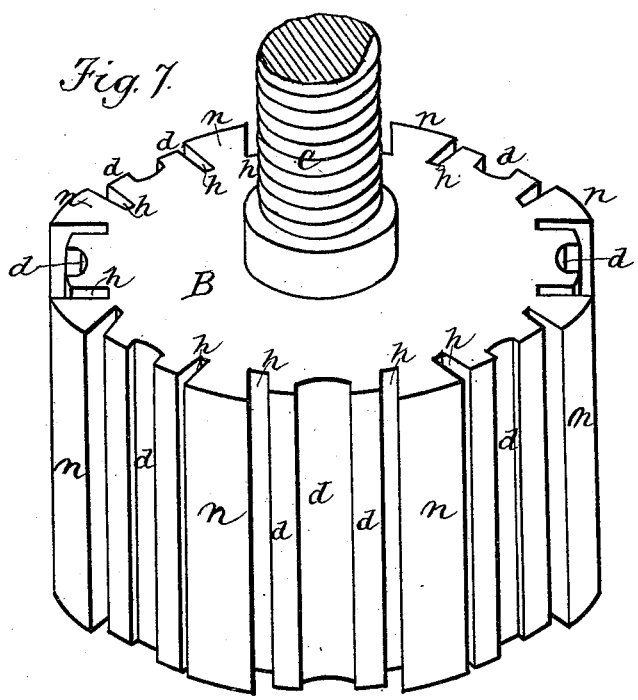
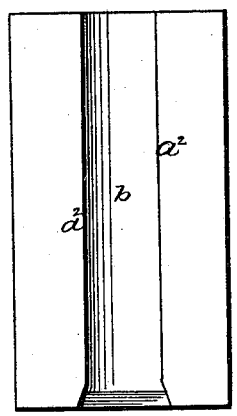
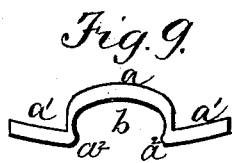
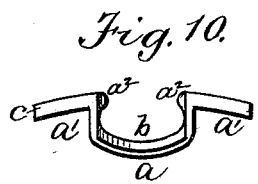

UNITED STATES PATENT OFFICE.

LEWIS HALLOCK NASH, OF BROOKLYN, ASSIGNOR TO THE NATIONAL METER COMPANY, OF NEW YORK, N. Y.

APPARATUS FOR CONSTRUCTING WATER-METERS.

SPECIFICATION forming part of Letters Patent No. 408,508, dated August 6, 1889.

Application filed January 13, 1886. Serial No. 188,463. (No model.)

*To all whom it may concern:*

Be it known that I, LEWIS HALLOCK NASH, a citizen of the United States, residing at Brooklyn, in the county of Kings and State of New York, have invented new and useful Improvements in Manufacturing Water-Meters, of which the following is a specification.

My present invention consists of improvements in apparatus for constructing water-meters, and is illustrated in the drawings making part of this specification, as employed in the manufacture of a meter now well known in the trade as the "Crown," which is fully described in patents granted to me January 21 and 28, 1879, and July 17, 1883. Said patent granted January 21, 1879, was reissued. My present invention is, however, obviously applicable to other forms of meters than those described in said patents. In said patent granted to me of date July 17, 1883, the joint-forming bearings of the case-wall projections of the meter there illustrated are made of soft metal, cast directly upon dovetail locking projections of the chamber-wall, whereas in my present plan I use soft metal or a cementing substance as the means of securing a hard-metal facing to these wall projections or other bearings of the meter and find the meter thereby to be more durable at the point of wear.

The specific improvement herein consists of an apparatus for aiding in the manufacture of the meter in the particular of setting the hard-metal bearings preparatory to fastening them to the case, and I will now proceed to describe such matter, it being understood that the improvement relating to the joint-forming projection or other facings as a matter of construction is made the subject of a separate and distinct application for a patent filed by me of even date herewith under Serial No. 188,462.

Figure 2:
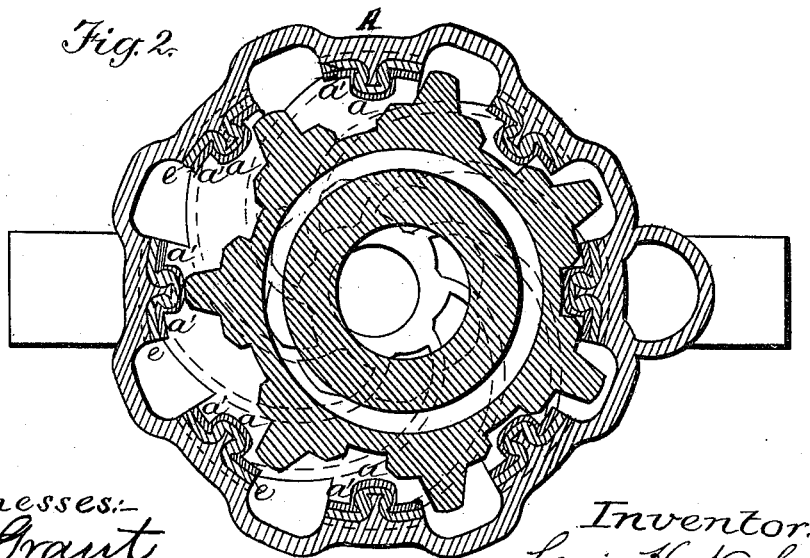
Figure 3:
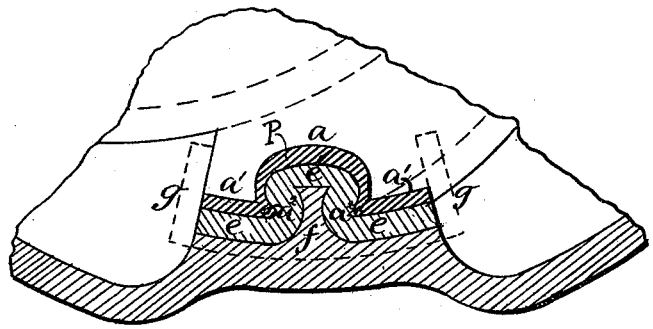
Figure 4:
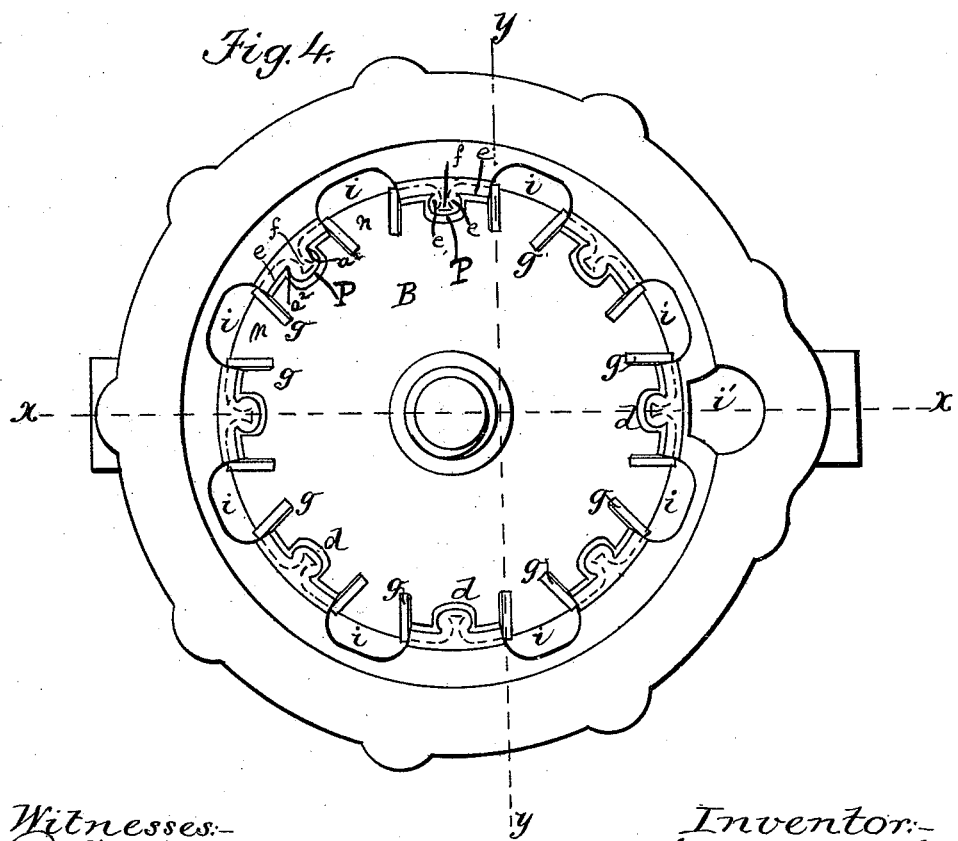
Figure 5:
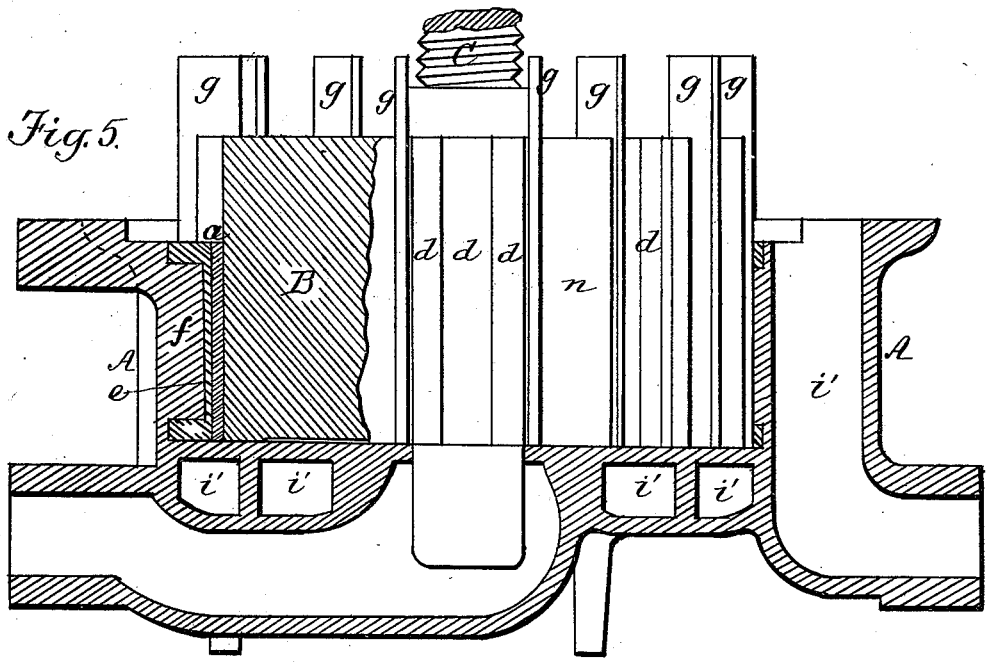
Figure 6:
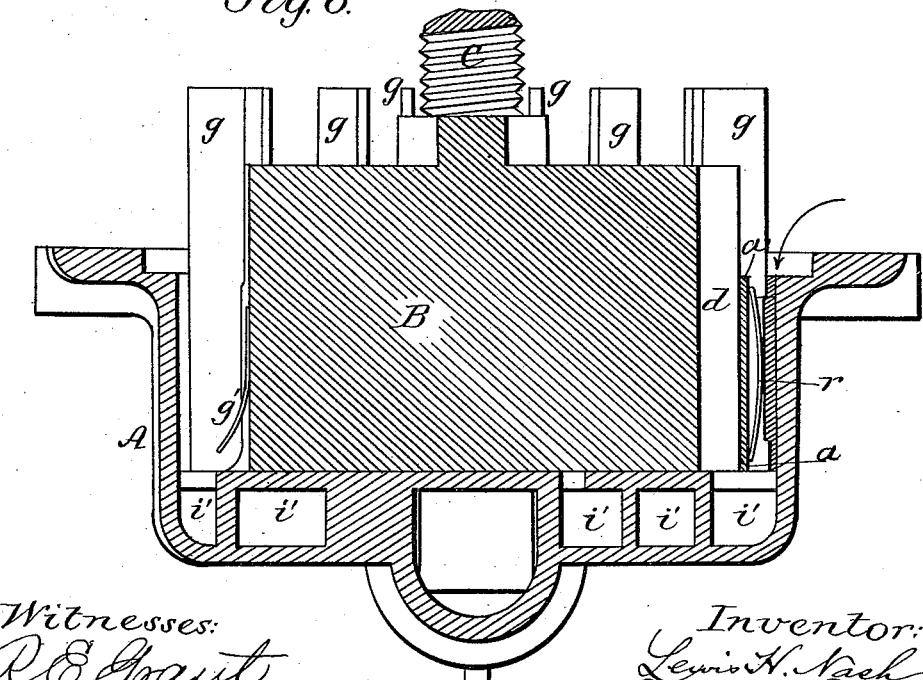

Referring to the drawings, Figure 1 shows the interior of the meter-case in top view.
Fig. 2 shows the case with the piston in the relation it occupies in dividing the chamber into receiving and discharging measuring-spaces. Fig. 3 is an enlarged horizontal sectional detail of a portion of the case and one of its wall projections. Fig. 4 represents the meter-case in top view and the core in the position it occupies in the operation of forming the case projection. Fig. 5 shows a vertical section taken on the line $x\ x$ of Fig. 4, showing the core partly in section and partly in elevation. Fig. 6 shows a vertical section taken on the line $y\ y$ of Fig. 4. Fig. 7 shows the core; and Figs. 8, 9, and 10 show, respectively, the inner side and top and bottom edges of the hard-metal facing of the case-wall projection.

The following is a description of the drawings forming part of this specification. The points of novelty will be designated in the concluding claims.

Referring to Figs. 2 and 3, it will be seen that the case-wall is formed with projections $f$, which are at equal distances apart around the chamber and are of such form, dovetail or otherwise, as to make a lock for a soft-metal filling or cement backing $e$, which in turn forms a lock for a hard-metal facing formed to suit the form of the piston projections and recesses, as shown. I prefer to use a soft-metal locking medium for the hard-metal facing, because when applied in a molten condition it hardens with perfect adhesion to the walls of the case and of the facing.

The hard-metal facings are of a hollow form, with a convex part $a$, which terminates in side wings $a'\ a'$, having faces curved coincident with the circle of the inner wall of the case-chamber, so as to suit the revolving movement of the piston, while the inner hollow side of the facing is of such shape as to form locks $b\ a^2$ at two or more points with the soft-metal backing. This soft-metal backing not only forms a filling for the hollow curved part $a$ of the facing, but forms a seat for the wings of the facing, so that the locking-points $a^2$ of the facing stand inward at the opposite sides of the dovetail case projections, while the ends of the latter stand into the hollow of the hard-metal facings, and thereby form a very effective securement for the latter.

While the soft-metal filling is locked to the chamber-wall projections, as stated, it is fur ther fastened thereto by being lapped over and under the ends of said projections, as shown in Fig. 5.

The case having been fitted to receive the facings, the hard-metal facings are properly placed in the chamber and held in relation to the case-wall locks by means of a core B or other suitable centering device, so as to leave a suitable space between the hard-metal facings and the wall-locks to receive the soft-metal backing $e$, by which the facings are permanently secured. The core is of cylindrical form, having surfaces $d\ d\ d$, made the counterpart of the case projections $a\ a\ a$, against which core-surfaces the hard-metal facings are held in proper positions to leave a space to receive the soft-metal backing.

The core B has surface projections $n$ between each conformation $d\ d\ d$, and vertical grooves $h$ are provided at the joining of the said projections $n$ with the said surface conformations $d$ to receive wall-strips $g$, which project from the core in a manner to form closures or molding-surfaces for the vertical sides of the spaces aforesaid, which are formed to receive the soft-metal backing.

When the parts are properly adjusted, the soft metal is poured into the aforesaid spaces to fill them between the wall-strips within the facing back and over the wall-dovetails, as shown in Figs. 3, 4, and 5. Before this operation the intervening case-spaces $i$ and all the passages $i'$ of the case are filled with sand or other suitable material to prevent them from being filled by the melted metal. I may use springs $g'$, (shown in Fig. 6,) by which to keep the wall-strips $g$ pressed out against the case, and I may use springs $r$, Fig. 6, by which to press and hold the hard-metal facings against the core counterpart $d\ d'\ d$ during the operation of pouring in the soft-metal backing. In this way each hard-metal facing is secured separately to the case-wall, the metal being poured in the space at the top, as shown by the arrow in Fig. 6. After this the core is withdrawn and the strips $g$ knocked off, leaving the meter-case complete.

A convenient way of mounting the core is by means of a screw-stem C, shown as connected centrally with the outer end of the core. This means of forming the facings of the case gives the advantage of replacing any or all the said surfaces, when they become worn, at small cost, and thus making the meter as good as new. This means of forming the bearing-surfaces of the case also gives the advantage of casting the chamber-forming body of the meter, if desired, in one piece, so that it may be finished in a lathe at small cost for the reception of the bearing-surfaces. I prefer to use the core to hold the hard-metal facings in place as a simple means; but other centering means may be employed to temporarily hold the facings in position while metal is being poured in.

As shown in Fig. 6, the springs $g'$ are secured to slots made in strips $g$, so that the springs press against the core, and thus press the strips outward against the case-wall. The springs $r$ are slipped in place, as shown, between facings and the case-wall projections $f$, so as to hold the said metal facings against the core and be embedded in the soft metal.

I claim—

1. The means substantially herein described for attaching separate and isolated facings to the chamber-walls of a water-meter, which consists of a core having a surface conformation adapted to hold said isolated facings in proper relative position to said chamber-walls during the operation of attaching them thereto, combined with a suitable molding-surface for confining the sides of the facings, the spaces to be filled by cementing material, and for separating said surfaces from each other.

2. The means for attaching a plurality of separate and isolated facings to the chamber-walls of a water-meter, which consist of a core having a surface conformation adapted to hold said facings in the proper relative position and having grooves therein at the sides of said facings, in combination with removable strips adapted to be set in said grooves, which with said facings form spaces to receive a suitable backing, substantially as described.

3. The means for attaching facings to the chamber-walls of a water-meter, which consists of a core having a surface conformation adapted to hold said facings in the proper relative position and having seats at the sides of said facings, in combination with removable strips and springs $g'$, the strips being adapted to be set in said seats, which with said facings form spaces to receive a cement backing, substantially as described.

4. The means substantially herein described for centering metal facings and supporting them concentrically within the chamber of a water-meter case for securement to the radial projections of the wall thereof, which consists of a core corresponding to the said metal facings, whereby the latter are supported in proper relation to wall projections in the operation of fixing said facings to form a durable wearing-surface, combined with a suitable molding-surface for confining at their sides the spaces to be filled by cementing material and for separating said surfaces from each other.

5. A cylindrical centering-core having circumferential recess-surfaces $d$ the counterpart of the chamber-wall projections of a water-meter, and having vertical grooves $h$ on each side of said recess-surfaces $d$, in combination with removable strips adapted to be set in said core-grooves, whereby to form with the said facings closures for spaces to receive a cement backing in the operation of fixing said facings, substantially as described.

6. The combination of a core B, placed within the chamber of a water-meter, the hard-metal facings placed vertically within and upon said core opposite the chamber-wall projections, leaving an intermediate space, and the vertical strips $g$, arranged to inclose said space to receive a cementing filling, whereby to permanently secure said facings to said wall projections, as described.

In testimony whereof I have hereunto set my hand in the presence of two subscribing witnesses.

LEWIS HALLOCK NASH.

Witnesses:
 H. W. BRINCKERHOFF,
 WILLIAM C. WESTERVELT.